US011157116B2

United States Patent
Kim et al.

(10) Patent No.: US 11,157,116 B2
(45) Date of Patent: Oct. 26, 2021

(54) TOUCH PANEL CONTROLLER HAVING REDUCED NOISE AND POWER CONSUMPTION AND SENSING DEVICE INCLUDING THE SAME

(71) Applicant: SAMSUNG ELECTRONICS CO., LTD., Suwon-si (KR)

(72) Inventors: Chadong Kim, Seoul (KR); Bumsoo Kim, Seoul (KR); Jongmin Baek, Hwaseong-si (KR); Gyeonggon Lee, Hwaseong-si (KR); Jinchul Lee, Seoul (KR); Choonghoon Lee, Seoul (KR); Yunrae Jo, Yongin-si (KR); Yoonkyung Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/813,943

(22) Filed: Mar. 10, 2020

(65) Prior Publication Data
US 2020/0387248 A1    Dec. 10, 2020

(30) Foreign Application Priority Data
Jun. 5, 2019    (KR) .................... 10-2019-0066785

(51) Int. Cl.
*G06F 3/044*    (2006.01)
(52) U.S. Cl.
CPC .... *G06F 3/044* (2013.01); *G06F 2203/04112* (2013.01)

(58) Field of Classification Search
CPC ................... G06F 2203/04112; G06F 3/044
See application file for complete search history.

(56) References Cited

U.S. PATENT DOCUMENTS

| | | | |
|---|---|---|---|
| 8,248,383 B2 | 8/2012 | Dews et al. | |
| 9,665,221 B2* | 5/2017 | Han | G06F 3/04166 |
| 9,727,183 B2 | 8/2017 | Byun et al. | |
| 2011/0298746 A1 | 12/2011 | Hotelling | |
| 2012/0050217 A1* | 3/2012 | Noguchi | G06F 3/04184 |
| | | | 345/174 |
| 2012/0194469 A1* | 8/2012 | Wang | G06F 3/0446 |
| | | | 345/174 |
| 2015/0102827 A1* | 4/2015 | Byun | G06F 3/04182 |
| | | | 324/679 |

(Continued)

*Primary Examiner* — Chun-Nan Lin
(74) *Attorney, Agent, or Firm* — F. Chau & Associates, LLC

(57) ABSTRACT

A sensing device includes a touch panel including first and second sensor electrodes, and a touch panel controller acquiring a sensing signal from the touch panel and detecting a user input based on the sensing signal. The touch panel controller acquires the sensing signal from at least one of the first sensor electrodes and the second sensor electrodes in a first mode operating at a first power. The touch panel controller selects a first transmitting electrode, a second transmitting electrode, and receiving electrodes from one of the first sensor electrodes and the second sensor electrodes, inputs a first driving signal to the first transmitting electrode, and inputs a second driving signal having a phase difference of 180 degrees with respect to the first driving signal to the second transmitting electrode in a second mode operating at a second power and a third mode in which a sensing operation is performed.

9 Claims, 16 Drawing Sheets

(56) References Cited

U.S. PATENT DOCUMENTS

| | | | |
|---|---|---|---|
| 2015/0177887 A1* | 6/2015 | Schwartz | G06F 3/04184 |
| | | | 345/174 |
| 2017/0031507 A1* | 2/2017 | Huang | G06F 3/0446 |
| 2017/0090668 A1* | 3/2017 | Agarwal | G06F 3/044 |
| 2017/0255295 A1* | 9/2017 | Tanemura | G06F 3/041662 |
| 2017/0300168 A1* | 10/2017 | Wu | G06F 3/0446 |
| 2017/0364184 A1* | 12/2017 | Weinerth | G06F 3/0442 |
| 2019/0212856 A1* | 7/2019 | Ding | G02F 1/13338 |
| 2020/0387248 A1* | 12/2020 | Kim | G06F 3/044 |

\* cited by examiner

| OPERATIONAL MODE | DRIVING POWER(W) | DRIVING SENSOR LINE | TIMING |
|---|---|---|---|
| FIRST MODE | $P_1 (\geq P_{th})$ | FIRST SENSOR LINE AND SECOND SENSOR LINE | 1-Frame: act1 / inact1 ($t_{act1}$, $t_{inact1}$) |
| SECOND MODE | $P_2 (<P_{th})$ | FIRST SENSOR LINE OR SECOND SENSOR LINE | 1-Frame: act2 / inact2 ($t_{act2}$, $t_{inact2}$) |
| THIRD MODE | UNLIMITED (FOR MAXIMUM SNR) | | 1-Frame: act3 ($t_{act3}$) |

FIG. 2

TOUCH PANEL CONTROLLER HAVING REDUCED NOISE AND POWER CONSUMPTION AND SENSING DEVICE INCLUDING THE SAME

CROSS-REFERENCE TO RELATED APPLICATION

This application claims priority under 35 U.S.C. § 119 to Korean Patent Application No. 10-2019-0066785, filed on Jun. 5, 2019 in the Korean Intellectual Property Office, the disclosure of which is incorporated by reference herein in its entirety.

TECHNICAL FIELD

Exemplary embodiments of the present inventive concept relate to a touch panel controller and a sensing device including the same.

DISCUSSION OF RELATED ART

As display devices have been miniaturized, interference between a touch panel and a display panel included in display devices has increased. Accordingly, magnitudes of noise signals generated in display devices have also increased.

In a display device, noise signals flowing into a touch panel from a display panel may degrade sensing sensitivity, and noise signals flowing into the display panel from the touch panel may degrade image quality.

SUMMARY

According to an exemplary embodiment of the present inventive concept, a sensing device includes a touch panel including a plurality of first sensor electrodes and a plurality of second sensor electrodes, and a touch panel controller acquiring a sensing signal from the touch panel and detecting a user input based on the sensing signal. The touch panel controller acquires the sensing signal from at least one of the plurality of first sensor electrodes and the plurality of second sensor electrodes in a first mode operating at a first power. The touch panel controller selects a first transmitting electrode, a second transmitting electrode, and a plurality of receiving electrodes from one of the plurality of first sensor electrodes and the plurality of second sensor electrodes, inputs a first driving signal to the first transmitting electrode, and inputs a second driving signal to the second transmitting electrode in a second mode operating at a second power lower than the first power, and a third mode in which a proximity sensing operation is performed. The second power has a phase difference of 180 degrees with respect to the first driving signal.

According to an exemplary embodiment of the present inventive concept, a sensing device includes a first electrode receiving a first driving signal and a second electrode receiving a second driving signal, a plurality of third electrodes disposed between the first electrode and the second electrode and extending in a direction that is the same as directions of the first electrode and the second electrode, an electric charge amplifier outputting a first voltage signal corresponding to a change in capacitance between a portion of the plurality of third electrodes and the first electrode, and outputs a second voltage signal corresponding to a change in capacitance between the other portion of the plurality of third electrodes and the second electrode, and a processor detecting a user input using the first voltage signal and the second voltage signal. The first driving signal and the second driving signal have a phase difference of 180 degrees therebetween.

According to an exemplary embodiment of the present inventive concept, a touch panel controller includes a sensing circuit driving a touch panel including a plurality of first sensor electrodes and a plurality of second sensor electrodes, selecting a plurality of first receiving electrodes, a plurality of second receiving electrodes, and at least one shielding electrode from one of the plurality of first sensor electrodes and the plurality of second sensor electrodes, and acquiring a sensing signal from among the plurality of first receiving electrodes and the plurality of second receiving electrodes, and a processor controlling the sensing circuit and detecting a user input using the sensing signal. The shielding electrode is disposed between the plurality of first receiving electrodes and the plurality of second receiving electrodes.

BRIEF DESCRIPTION OF DRAWINGS

The above and other aspects and features of the present inventive concept will be more clearly understood by describing in detail exemplary embodiments thereof with reference to the accompanying drawings.

FIG. 2 is a diagram illustrating an operational mode of a sensing device according to an exemplary embodiment of the present inventive concept.

DETAILED DESCRIPTION OF THE EMBODIMENTS

Figure 1:
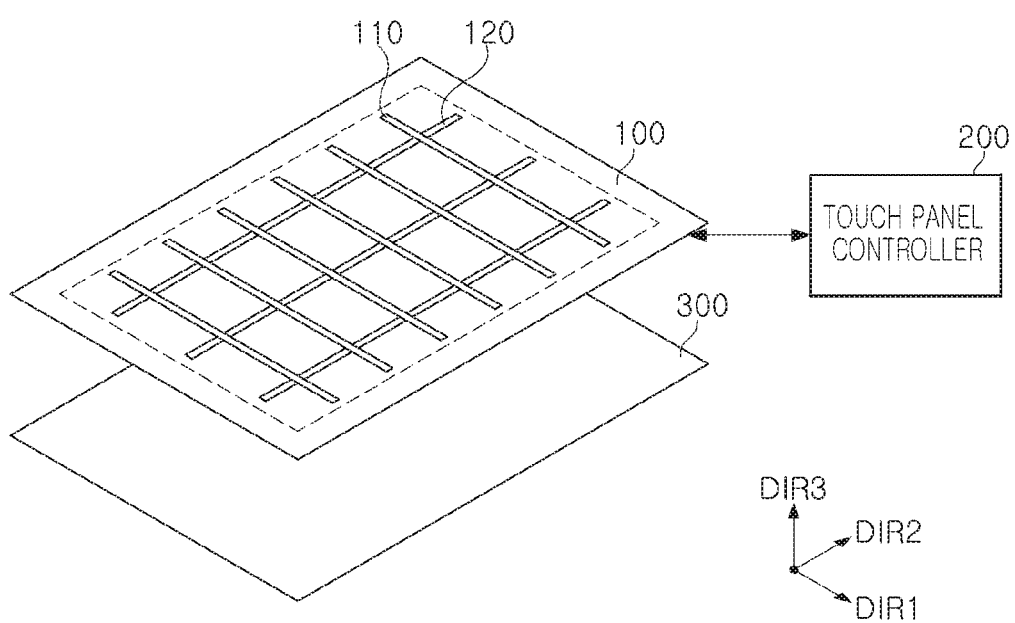
FIG. 1 is a diagram illustrating a sensing device including a touch panel controller according to an exemplary embodiment of the present inventive concept.

Exemplary embodiments of the present inventive concept provide a touch panel controller which may remove noise signals between a touch panel and a display panel and may significantly reduce power consumption, and a sensing device including the same.

Hereinafter, exemplary embodiments of the present inventive concept will be described in detail with reference to the accompanying drawings. Like reference numerals may refer to like elements throughout this application.

FIG. 1 is a diagram illustrating a sensing device including a touch panel controller according to an exemplary embodiment.

Referring to FIG. 1, a display device may include a touch panel 100, a touch panel controller 200, and a display panel 300. The touch panel 100 and the touch panel controller 200 may be included in a sensing device.

The touch panel 100 may be disposed on an upper portion of the display panel 300 and may overlap the display panel 300. For example, the touch panel 100 may be disposed in an upper portion of an image display surface of the display panel 300. FIG. 1 illustrates an example in which the touch panel 100 is spaced apart from the display panel 300, but the inventive concept is not limited thereto. For example, the touch panel 100 may be integrated with the display panel 300.

The touch panel 100 may include at least one or more transparent substrates and a plurality of sensor electrodes 110 and 120 disposed on the at least one or more transparent substrates. The plurality of sensor electrodes 110 and 120 may be formed of a transparent conductive material such as indium tin oxide (ITO), zinc oxide (ZnO), indium zinc oxide (IZO), a carbon nanotube, or the like, or may include an extremely thin metal pattern.

The plurality of sensor electrodes 110 and 120 may include a plurality of first sensor electrodes 110 extending in a first direction DIR1 and a plurality of second sensor electrodes 120 extending in a second direction DIR2 perpendicular to the first direction DIR1, disposed on the at least one or more transparent substrates.

In FIG. 1, the first sensor electrodes 110 and the second sensor electrodes 120 may have a matrix shape, but the shape is not limited thereto. For example, the first sensor electrodes 110 and the second sensor electrodes 120 may have various other shapes, such as a diamond shape, a circular shape, or the like.

The first sensor electrodes 110 may be electrically isolated from the second sensor electrodes 120. For example, the first sensor electrodes 110 may be electrically isolated from the second sensor electrodes 120 by being spaced apart from the second sensor electrodes 120 in a third direction DIR3 perpendicular to the first and second directions DIR1 and DIR2. In this case, a space between the first sensor electrodes 110 and the second sensor electrodes 120 may be insulated using an insulating material such as silicon oxide or the like.

The touch panel controller 200 may be electrically connected to the touch panel 100 and may transmit and receive various signals required for detecting a user input. For example, when the sensing device operates based on a mutual-capacitance method, the touch panel controller 200 may transmit a driving signal to at least one of the first sensor electrodes 110 and the second sensor electrodes 120 of the touch panel 100, and may receive a sensing signal from at least one of the first sensor electrodes 110 and the second sensor electrodes 120. Additionally, when the sensing device operates based on a self-capacitance method, the touch panel controller 200 may receive a sensing signal from at least one of the first sensor electrodes 110 and the second sensor electrodes 120. In exemplary embodiments of the present inventive concept, the sensor electrodes receiving a driving signal may be referred to as transmitting electrodes TXE, and the sensor electrodes outputting a sensing signal may be referred to as receiving electrodes RXE.

The touch panel controller 200 may include an analog circuit, an analog-digital converter, a processor, or the like, for transmitting and receiving various signals for detecting a user input.

The display panel 300 may include a plurality of scan lines and a plurality of data lines. The display panel 300 may also include a plurality of pixels connected to the scan lines and the data lines. The display panel 300 may receive various driving signals via the scan lines and the data lines and may drive the plurality of pixels, to display various images. The display panel 300 may include a liquid crystal display (LCD), a light emitting diode (LED) display, an organic light emitting diode (OLED) display, or the like.

FIG. 2 is a diagram illustrating an operational mode of a sensing device according to an exemplary embodiment of the present inventive concept.

Referring to FIG. 2, an operational mode of a sending device may include first to third modes of which operational timings are different from one another depending on a level of driving power, a method of driving a sensor line (referred to interchangeably as "a sensor electrode"), or the like.

In the first mode, the sensing device may be supplied with first power P1 that is the same as or higher than a predetermined threshold value Pth, and may perform a sensing operation. In exemplary embodiments of the present inventive concept, the sensing device may perform the sensing operation based on a self-capacitance method. In this case, the sensing device may select a plurality of transmitting electrodes and a plurality of receiving electrodes from first sensor electrodes and second sensor electrodes.

In the first mode, a single frame period of the sensing device may include an active section act1 and an inactive section inact1. In the active section act1, the sensing device may detect whether a user input occurs and a position (a coordinate value) in which the user input occurs. In the inactive section inact1, the sensing device may not perform a sensing operation to reduce power consumption. In exemplary embodiments of the present inventive concept, a time period $t_{act1}$ of the active section act1 may be longer than a time period $t_{inact1}$ of the inactive section inact1.

In the second mode, the sensing device may be supplied with second power P2 that is less than the predetermined threshold value Pth, and may perform a sensing operation. In exemplary embodiments of the present inventive concept, the sensing device may perform a sensing operation based on a self-capacitance method. In this case, the sensing device may select a plurality of transmitting electrodes and a plurality of receiving electrodes from one of the first sensor electrodes and the second sensor electrodes.

In the second mode, a single frame period of the sensing device may include an active section act2 and an inactive section inact2. In the active section act2, the sensing device may only detect whether a user input occurs. In the inactive section inact2, the sensing device may not perform a sensing operation to reduce power consumption. In exemplary embodiments of the present inventive concept, a time period $t_{act2}$ of the active section act2 may be shorter than a time period $t_{inact2}$ of the inactive section inact2.

In the third mode, the sensing device may perform a sensing operation based on a self-capacitance method without a limitation in driving power. For example, the sensing device may be supplied with power that is the same as or higher than the first power P1, and may perform a proximity sensing operation to acquire a hovering signal in which a signal-to-noise ratio (SNR) is at a maximum. In this case, the sensing device may select a plurality of transmitting electrodes and a plurality of receiving electrodes from one of the first sensor electrodes and the second sensor electrodes.

In the third mode, a single frame period of the sensing device may only include an active section act3. During the active section act3, the sensing device may perform a proximity sensing operation. In the proximity sensing operation, a change in capacitance of the sensing device may be relatively small as compared to a touch sensing operation, and accordingly, it may be necessary to increase sensing sensitivity. Thus, in the third mode, the sensing device may lengthen a time period $t_{act3}$ of the active section act3 in which a sensing operation is performed to be longer than the time periods and $t_{act1}$ and $t_{act2}$ of the other modes, or may increase a magnitude of a driving signal.

Figure 3:
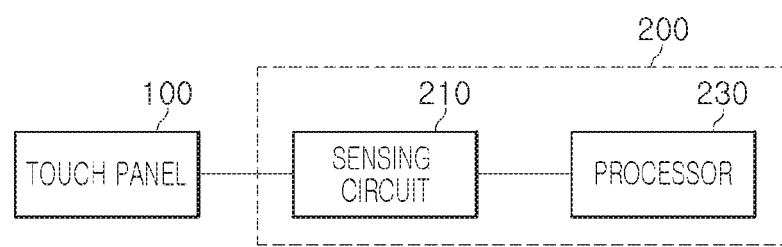
FIG. 3 is a block diagram illustrating configuration of the touch panel controller of FIG. 1 according to an exemplary embodiment of the present inventive concept.

FIG. 3 is a block diagram illustrating a configuration of the touch panel controller of FIG. 1 according to an exemplary embodiment of the present inventive concept.

Referring to FIG. 3, a touch panel controller 200 may include a sensing circuit 210 and a processor 230.

The sensing circuit 210 may be electrically connected to the touch panel 100 and may receive various signals required for detecting a user input. For example, when the sensing device operates based on a mutual-capacitance method, the sensing circuit 210 may transmit a driving signal to a transmitting electrode TXE, and may receive a sensing signal from a receiving electrode RXE. When the sensing device operates based on a self-capacitance method, the sensing circuit 210 may receive a sensing signal from the receiving electrode RXE. In exemplary embodiments of the present inventive concept, a driving signal may be a square wave signal, and the sensing signal may be an electrical signal corresponding to electric charge generated by the sensor electrodes.

The sensing circuit 210 may include a driver selecting a transmitting electrode TXE and a receiving electrode RXE and transmitting a driving signal to the transmitting electrode TXE, an electric charge amplifier converting electric charge generated in the receiving electrode RXE to a voltage signal and outputting the voltage signal, an analog-digital converter converting the voltage signal output from the electric charge amplifier to a digital signal, and the like.

The processor 230 may control overall operations of the touch panel controller 200, may receive a digital signal from the sensing circuit 210, and may detect whether a user input occurs, a position in which a user input occurs (a coordinate value), or the like. The processor 230 may be implemented as a digital signal processor (DSP) or the like.

Figure 4:
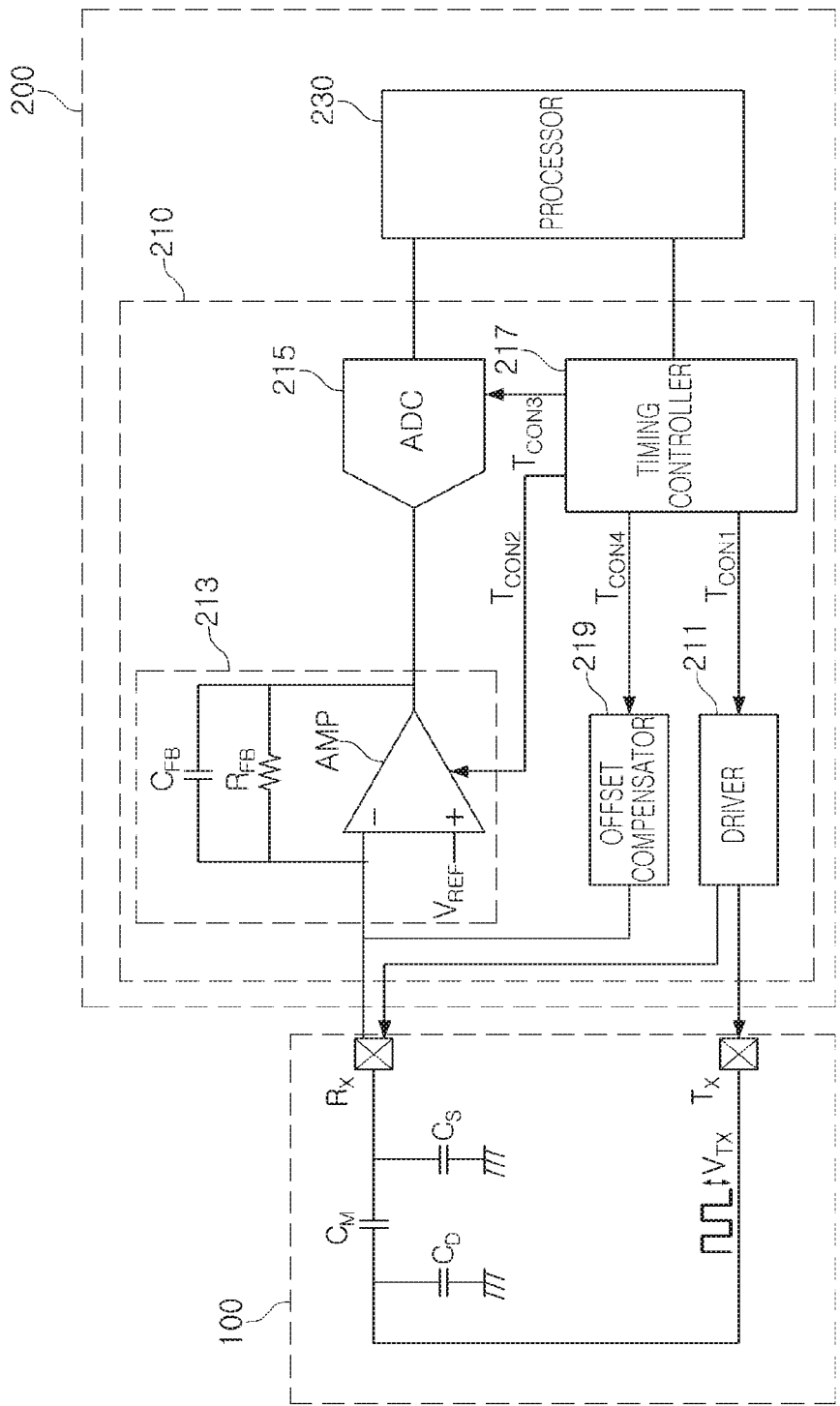
FIG. 4 is a circuit diagram illustrating the touch panel controller of FIG. 1 according to an exemplary embodiment of the present inventive concept.

FIG. 4 is a circuit diagram illustrating the touch panel controller of FIG. 1 according to an exemplary embodiment of the present inventive concept.

Referring to FIG. 4, the touch panel controller 200 may include the sensing circuit 210 and the processor 230.

The sensing circuit 210 may include a driver 211, an electric charge amplifier 213, an analog-digital converter 215, and a timing controller 217.

The driver 211 may select at least one transmitting electrode TXE and at least one receiving electrode RXE from among first sensor electrodes and second sensor electrodes. In exemplary embodiments of the present inventive concept, the driver 211 may include a multiplexer MUX for selecting a transmitting electrode TXE and a receiving electrode RXE.

The driver 211 may input a driving signal to the transmitting electrode TXE through a transmitter $T_X$, and may receive a sensing signal from the receiving electrode RXE through a receiver $R_X$. In exemplary embodiments of the present inventive concept, a driving signal may be a square wave voltage signal having a peak-to-peak $V_{TX}$ of a certain level.

The electric charge amplifier 213 may include an operational amplifier AMP, a feedback resistor $R_{FB}$, and a feedback capacitor $C_{FB}$. The feedback resistor $R_{FB}$ may be connected between an inverting input terminal and an output terminal of the operational amplifier AMP, and the feedback capacitor $C_{FB}$ may be connected to the feedback resistor $R_{FB}$ in parallel. A reference voltage $V_{REF}$ having a certain level may be input to a non-inverting input terminal of the operational amplifier AMP. In exemplary embodiments of the present inventive concept, the reference voltage $V_{REF}$ may be a display noise signal VDN generated between the receiving electrode RXE and a common electrode of a display panel. The electric charge amplifier 213 may perform an amplifying operation using the display noise signal VDN as the reference voltage $V_{REF}$, thus removing the display noise signal VDN. The feedback resistor $R_{FB}$ and the feedback capacitor $C_{FB}$ may perform a filtering function to remove a ripple element from a voltage signal output from the electric charge amplifier 213.

The analog-digital converter 215 may convert a voltage signal output from the electric charge amplifier 213 to a digital signal, and may output the digital signal.

In exemplary embodiments of the present inventive concept, the sensing circuit 210 may further include a gain amplifier, such as a programmable gain amplifier (PGA), or an integrator, connected between an output terminal of the electric charge amplifier 213 and an input terminal of the analog-digital converter 215, to secure a maximum dynamic range.

The sensing circuit 210 may further include an offset compensator 219 connected to the inverting input terminal of the electric charge amplifier 213 to remove an offset of electric charge generated by the receiving electrode RXE to secure a maximum dynamic range.

The driver 211, the offset compensator 219, and the other elements described above may operate in accordance with timing signals TCON1 to TCON4 generated by the timing controller 217 under control of the processor 230.

The digital noise signal VDN, or a first noise signal VDN, flowing into the touch panel 100 from the display panel may be generated due to a first parasitic capacitance $C_S$ element generated between the receiving electrode RXE of the touch panel 100 and a common electrode of the display panel. The first noise signal VDN may decrease a magnitude of a sensing signal output from the receiving electrode RXE and may degrade sensing sensitivity.

A second noise signal VTN flowing into the display panel from the touch panel 100 may be generated due to a second parasitic capacitance $C_D$ element generated between the transmitting electrode TXE of the touch panel 100 and a common electrode of the display panel. The second noise signal VTN may degrade quality of an image of the display panel.

A mutual capacitance $C_M$ formed between the receiving electrode RXE and the transmitting electrode TXE will be described in detail below.

A magnitude of each of the first noise signal VDN and the second noise signal VTN may increase as a gap between the touch panel 100 and the display panel decreases. Thus, the touch panel controller 200 may drive the touch panel 100 differently depending on an operational mode of the sensing device to remove the first noise signal VDN and the second noise signal VTN and to significantly reduce power consumption.

In the description below, a method of driving a touch panel by a touch panel controller in accordance with an operational mode will be described in more detail with reference to FIGS. 5 to 7.

Figure 5:
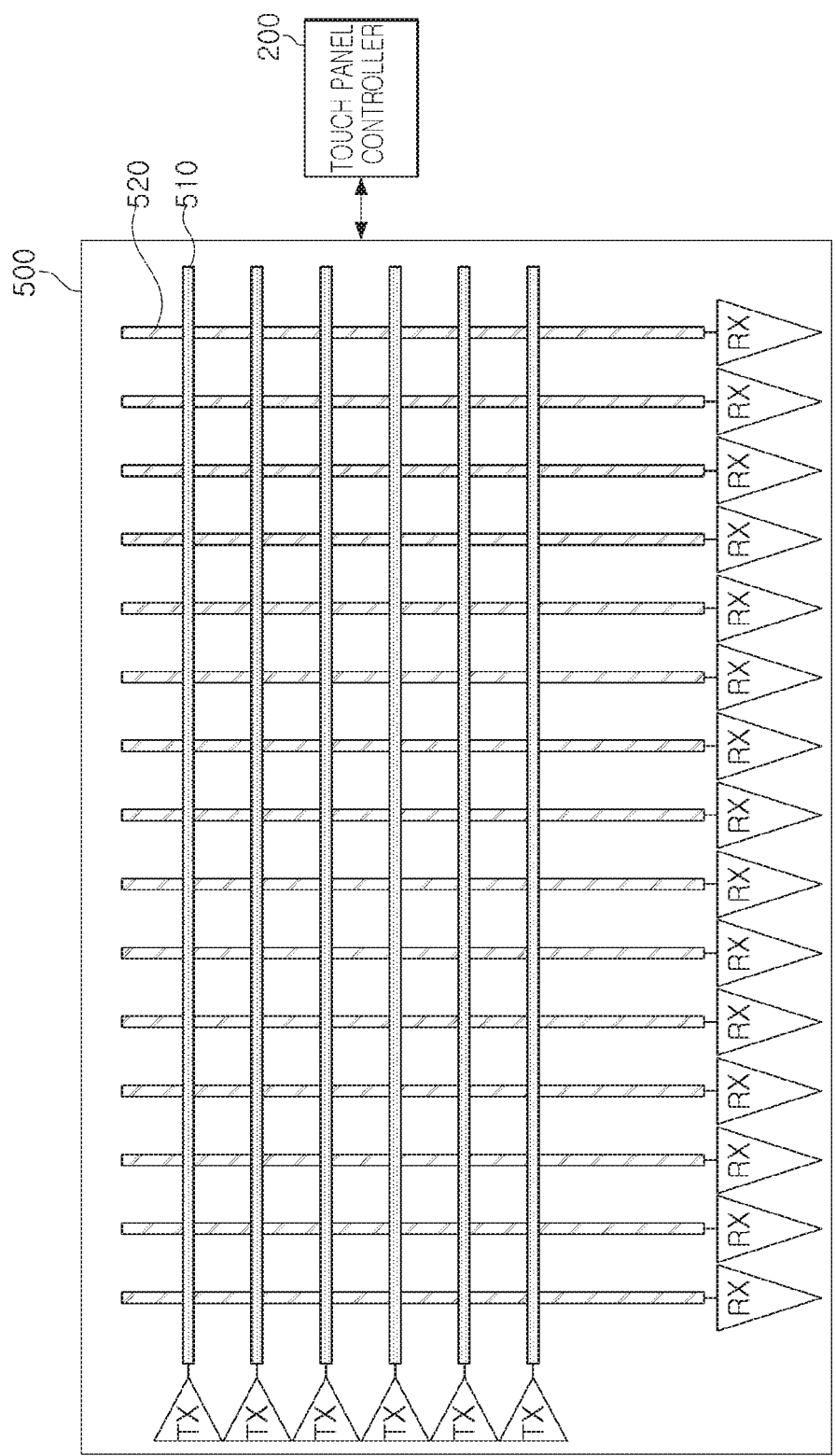
FIGS. 5 and 6 are diagrams illustrating a method for driving a touch panel with a touch panel controller according to exemplary embodiments of the present inventive concept.
Figure 6:
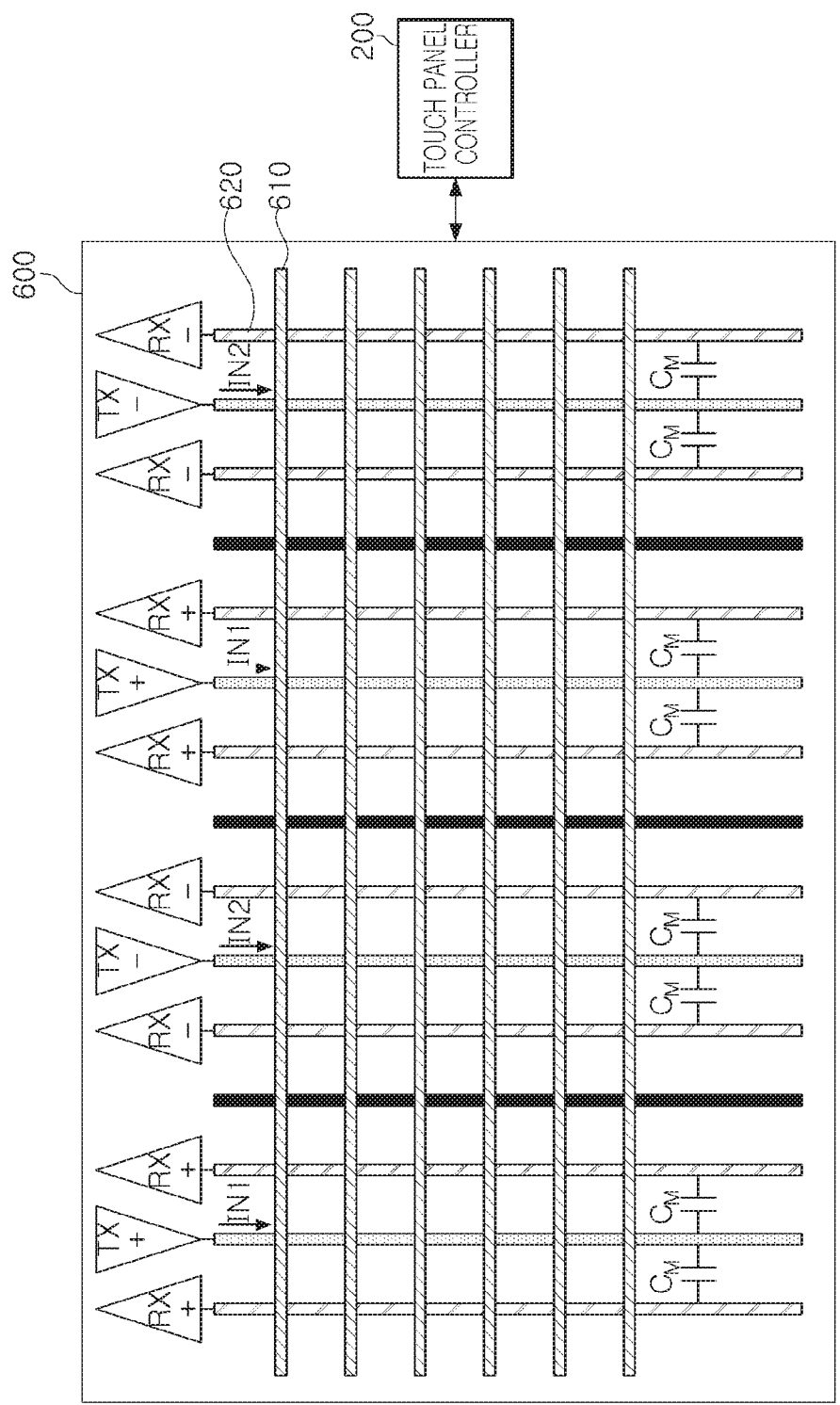

FIGS. 5 and 6 are diagrams illustrating a method for driving a touch panel with a touch panel controller according to exemplary embodiments of the present inventive concept. FIG. 7 is a diagram illustrating a method of removing a noise signal by a touch panel controller according to an exemplary embodiment of the present inventive concept.

FIG. 5 illustrates a method of driving a touch panel 500 when a sensing device operates in the first mode, and FIG. 6 illustrates a method of driving a touch panel 600 when a sensing device operates in the second mode and the third mode. In the exemplary embodiments of FIGS. 5 and 6, the sensing device may perform a sensing operation based on a mutual-capacitance method.

Referring to FIG. 5, when the sensing device operates in the first mode, the touch panel controller 200 may select first sensor electrodes 510 as transmitting electrodes TXE, and may select second sensor electrodes 520 as receiving electrodes RXE.

The touch panel controller 200 may input a driving signal to the transmitting electrodes TXE through a transmitter TX. Additionally, the touch panel controller 200 may receive a sensing signal from the receiving electrodes RXE through a receiver RX and may detect whether a user input occurs and a position (a coordinate value) in which the user input occurs.

FIG. 5 illustrates an example in which the first sensor electrodes 510 are the transmitting electrodes TXE and the second sensor electrodes 520 are the receiving electrodes RXE, but the inventive concept is not limited thereto. For example, the touch panel controller 200 may select the first sensor electrodes 510 as the receiving electrodes RXE and may select the second sensor electrodes 520 as the transmitting electrodes TXE.

Referring to FIG. 6, when the sensing device operates in the second mode or the third mode, the touch panel controller 200 may select at least a pair of transmitting electrodes TXE+ and TXE− from one of first sensor electrodes 610 and second sensor electrodes 620. Each pair of the transmitting electrodes TXE+ and TXE− may include a first transmitting electrode TXE+ connected to a transmitter TX+ and a second transmitting electrode TXE− connected to a transmitter TX−. A plurality of sensor electrodes may be disposed between the first transmitting electrode TXE+ and the second transmitting electrode TXE−.

The touch panel controller 200 may select a plurality of receiving electrodes RXE+ and RXE− from among a plurality of sensor electrodes disposed between the first transmitting electrode TXE+ and the second transmitting electrode TXE−. The plurality of receiving electrodes RXE+ and RXE− may include a first receiving electrode RXE+ connected to a receiver RX+ and a second receiving electrode RXE− connected to a receiver RX−. The first receiving electrode RXE+ may form a mutual capacitance $C_M$ with an adjacent first transmitting electrode TXE+, and the second receiving electrode RXE− may form the mutual capacitance $C_M$ with an adjacent second transmitting electrode TXE−.

In exemplary embodiments of the present inventive concept, the touch panel controller 200 may select at least one shielding electrode disposed between the first transmitting electrode TXE+ and the second transmitting electrode TXE− to prevent the mutual capacitance $C_M$ from being formed between the first transmitting electrode TXE+ and the second receiving electrode RXE− and between the second transmitting electrode TXE− and the first receiving electrode RXE+. In an exemplary embodiment of the present inventive concept, the touch panel controller 200 may select at least one of the plurality of sensor electrodes disposed between the first transmitting electrode TXE+ and the second transmitting electrode TXE− adjacent to the first transmitting electrode TXE+, and may connect the selected sensor electrode to a ground power or may float the selected sensor electrode, thus forming the shielding electrode.

The touch panel controller 200 may input a first driving signal IN1 to the first transmitting electrode TXE+ through the transmitter TX+. The touch panel controller 200 may also input a second driving signal IN2, having a phase difference of 180 degrees with respect to the first driving signal IN1, to the second transmitting electrode TXE− through the transmitter TX−.

The touch panel controller 200 may remove the second noise signal VTN flowing into the display panel from the touch panel 600 due to the second parasitic capacitance $C_D$ element by inputting the first driving signal IN1 and the second driving signal IN2 having a phase difference of 180 degrees therebetween to each pair of the transmitting electrodes TXE+ and TXE−. The touch panel controller 200 may also remove the first noise signal VDN flowing into the touch panel 600 from the display panel due to the first parasitic capacitance $C_S$ element by inputting the first driving signal IN1 and the second driving signal IN2 having a phase difference of 180 degrees therebetween to each pair of the receiving electrodes RXE+ and RXE−.

The touch panel controller 200 may connect one of the first sensor electrodes 610 and the second sensor electrodes 620, from which none of the transmitting electrodes TXE or the receiving electrodes RXE are selected, to a ground power or may float the sensor electrode, thus significantly reducing an effect of non-driven sensor electrodes affecting the transmitting electrodes TXE and the receiving electrodes RXE.

FIG. 6 illustrates an example in which the transmitting electrodes TXE and the receiving electrodes RXE are selected from among the second sensor electrodes 620, but the inventive concept is not limited thereto. The touch panel controller 200 may select the transmitting electrodes TXE and the receiving electrodes RXE from among the first sensor electrodes 610.

In the description below, an example of removing the first noise signal VDN and the second noise signal VTN by the touch panel controller 200 will be described in greater detail with reference to FIG. 7.

Figure 7:
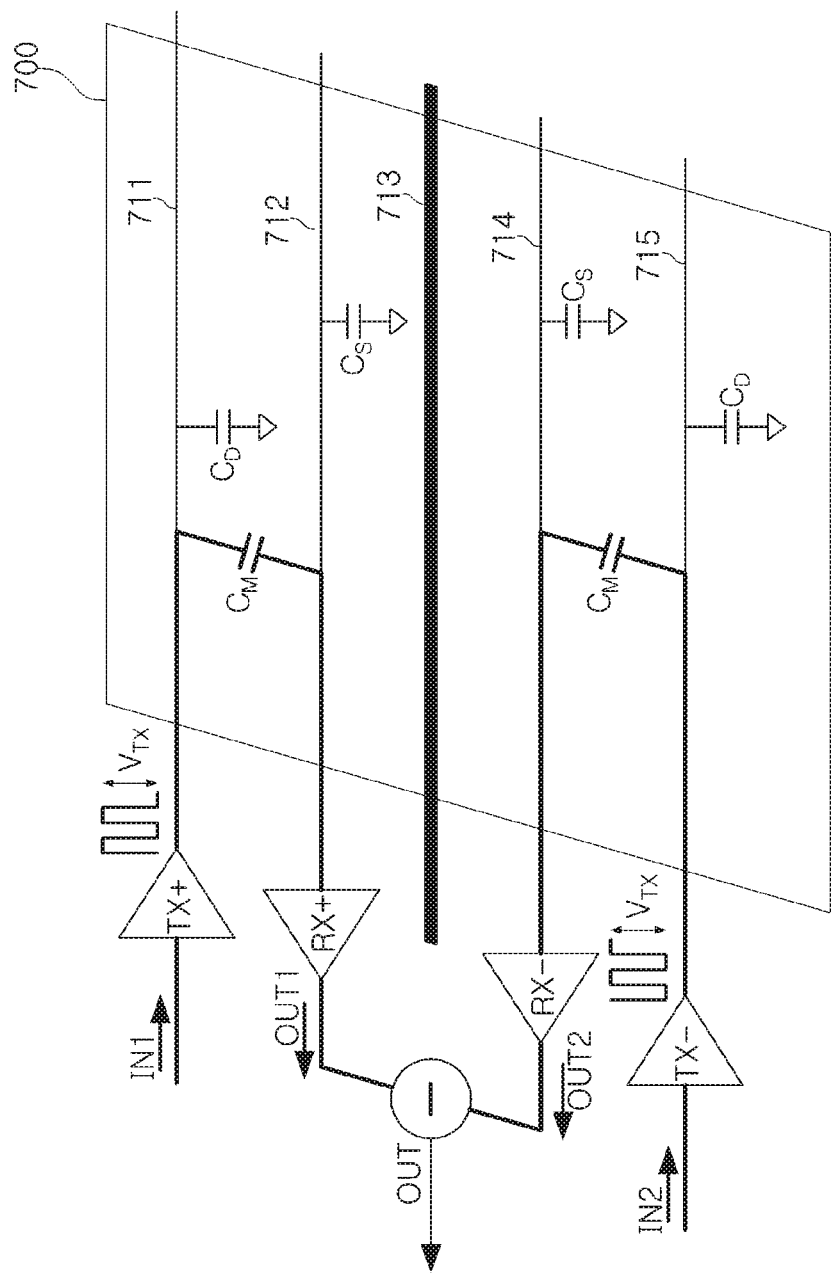
FIG. 7 is a diagram illustrating a method of removing a noise signal by a touch panel controller according to an exemplary embodiment of the present inventive concept.

In FIG. 7, only five first sensor electrodes 711 to 715 included in a touch panel 700 are illustrated for ease of description.

Referring to FIG. 7, the touch panel controller 200 may select a 1st first sensor electrode 711 as a first transmitting electrode TXE+, and may select a 5th first sensor electrode 715 as a second transmitting electrode TXE−. Additionally, the touch panel controller 200 may select a 2nd first sensor electrode 712 as a first receiving electrode RXE+, and may select a 4th first sensor electrode 714 as a second receiving electrode RXE−. The touch panel controller 200 may float a 3rd first sensor electrode 713 and may select the 3rd first sensor electrode 713 as a shielding electrode.

The touch panel controller 200 may input the first driving signal IN1 to the first transmitting electrode TXE+, and may input the second driving signal IN2 having a magnitude the same as a magnitude of the first driving signal IN1 and having a phase different from a phase of the first driving signal INTI by 180 degrees. In this case, the mutual capacitance CM may be formed between the first transmitting electrode TXE+ and the first receiving electrode RXE+, and a current path may be formed through the mutual capacitance CM. The mutual capacitance CM may also be formed between the second transmitting electrode TXE− and the second receiving electrode RXE−, and a current path may be formed through the mutual capacitance CM.

The first sensor electrodes 711 to 715 may have substantially the same area and substantially the same length. Accordingly, when an error in process is not considered, first parasitic capacitances $C_S$ formed in each of the receiving electrodes RXE+ and RXE− may be substantially the same, and second parasitic capacitances $C_D$ formed in each of the transmitting electrodes TXE+ and TXE− may be substantially the same.

Noise flowing into a common electrode of the display panel from the first transmitting electrode TXE+ may be $C_D \times V_{TX}$, and noise flowing into a common electrode of the display panel from the second transmitting electrode TXE− may be $-C_D \times V_{TX}$. Thus, the noises may be offset by each other and may be removed.

A first sensing signal OUT1 output from the first receiving electrode RXE+ may be represented by Equation 1 below.

$$\text{OUT1} = \Delta C_M V_{TX} + C_S V_{DN} \qquad \text{[Equation 1]}$$

In Equation 1, "$V_{DN}$" may refer to display noise generated between the receiving electrode RXE+ and the common electrode of the display panel.

A second sensing signal OUT2 output from the second receiving electrode RXE− may be represented by Equation 2 below.

$$\text{OUT2} = -\Delta C_M V_{TX} + C_S V_{DN} \qquad \text{[Equation 2]}$$

In Equation 2, "$V_{DN}$" may refer to display noise generated between the receiving electrode RXE− and the common electrode of the display panel.

The touch panel controller 200 may differentiate the second sensing signal OUT2 from the first sensing signal OUT1, thus generating a final sensing signal OUT used for detecting a user input. Accordingly, the final sensing signal OUT may be represented by Equation 3 below.

$$\text{OUT} = \text{OUT1} - \text{OUT2} = (\Delta C_M V_{TX} + C_S V_{DN}) - (-\Delta C_M V_{TX} + C_S V_{DN}) = 2\Delta C_M V_{TX} \qquad \text{[Equation 3]}$$

Referring to Equation 3, the display noises $V_{DN}$ may be offset by each other and may be removed. Additionally, a magnitude of the final sensing signal OUT may increase by twice the magnitudes of the first and second sensing signals OUT1 and OUT2.

Consequently, the touch panel controller 200 in the present exemplary embodiment may configure the transmitting electrodes TXE+ and TXE− as a pair of transmitting electrodes in which signals having a phase difference of 180 degrees therebetween are input, respectively, may select the receiving electrodes RXE+ and RXE− to be disposed in parallel to the transmitting electrodes TXE+ and TXE−, and may perform a differential calculation with respect to the first and second sensing signals OUT1 and OUT2 output from the receiving electrodes RXE+ and RXE−, respectively. As such, all noise elements caused by mutual interference between the touch panel 600 and the display panel may be removed. Thus, without considering noise elements, the touch panel controller 200 may increase a magnitude $V_{TX}$ of the driving signals IN1 and IN2, and accordingly, sensing sensitivity and image quality of the display panel may improve.

Additionally, the touch panel controller 200 in the present exemplary embodiment may increase a magnitude of the final sensing signal OUT to twice the magnitude of each of the first and second sensing signals OUT1 and OUT2. Accordingly, the touch panel controller 200 may decrease the number of sensor lines required for detecting a user input in the same size of a sensing area, thus reducing power consumption.

Figure 8A:
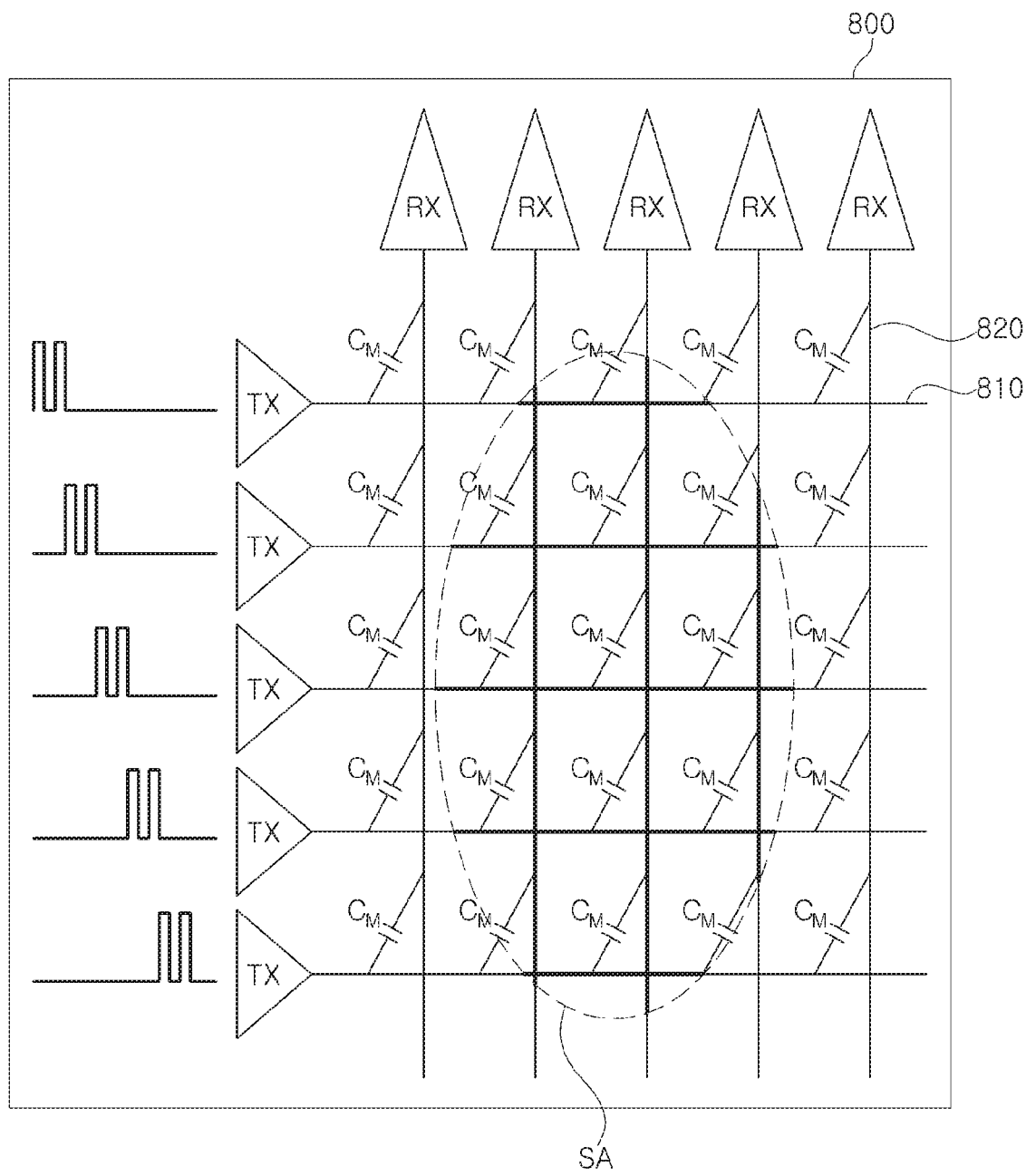
FIGS. 8A to 8C are diagrams illustrating an effect of reducing the number of driving channels of a touch panel controller according to exemplary embodiments of the present inventive concept.
Figure 8B:
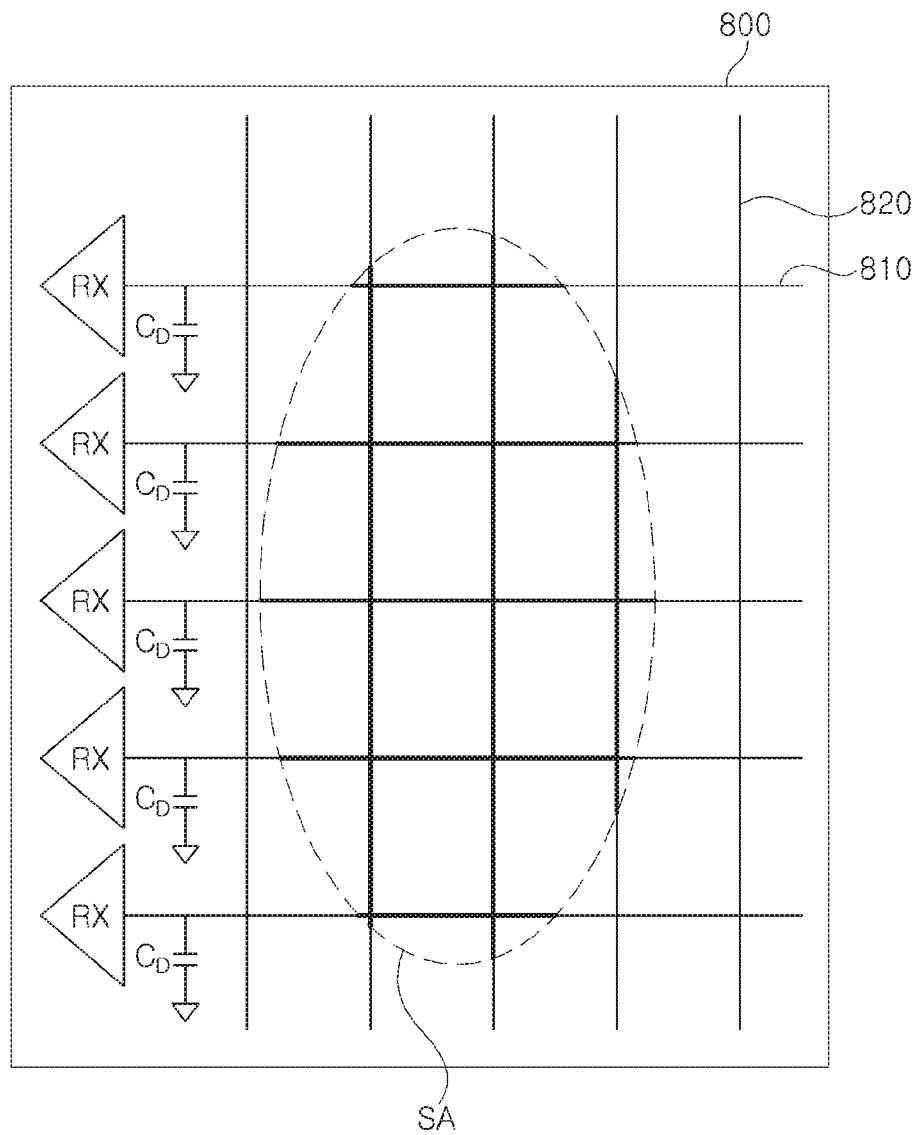
Figure 8C:
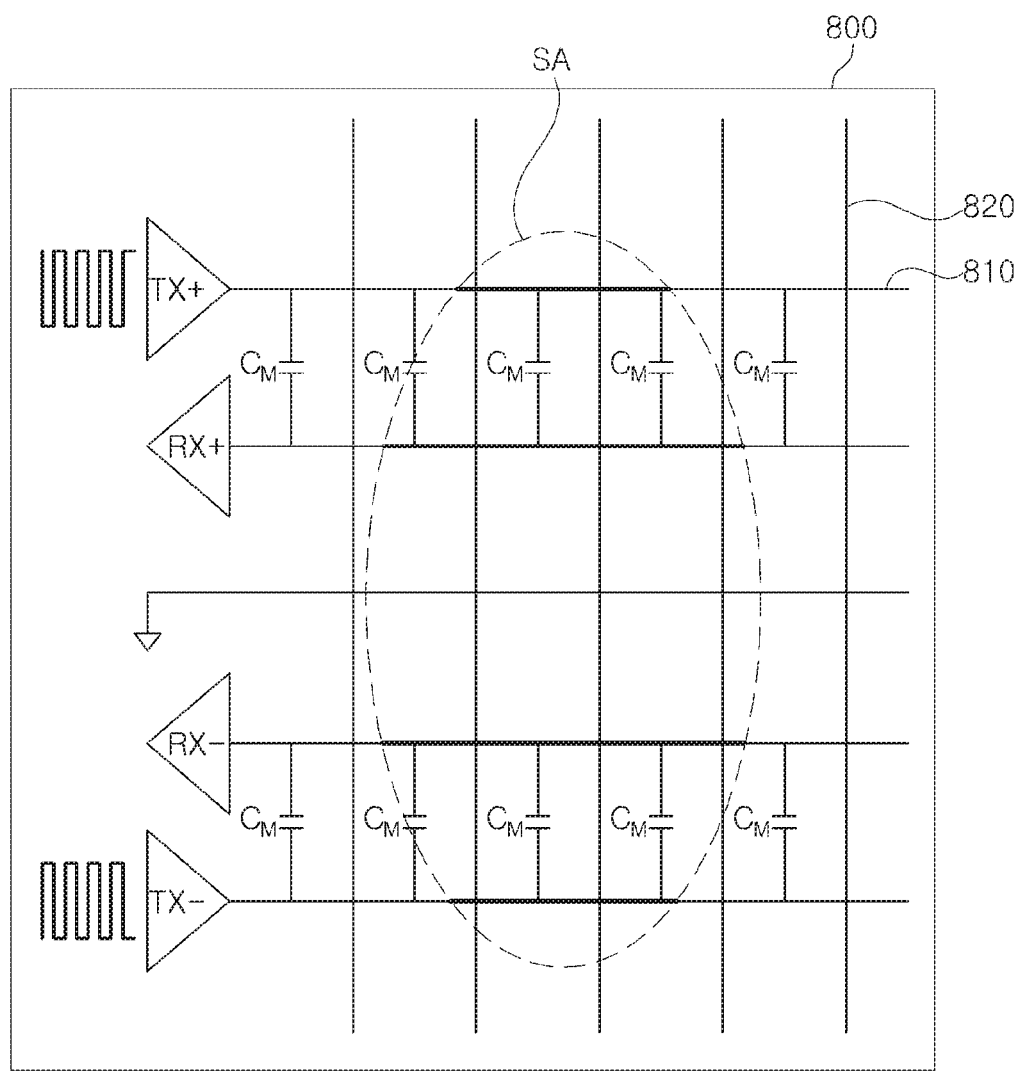

FIGS. 8A to 8C are diagrams illustrating an effect of reducing the number of driving channels of a touch panel controller according to exemplary embodiments of the present inventive concept.

In the exemplary embodiments illustrated in FIGS. 8A to 8C, the sensing areas SA may have substantially the same area.

Referring to FIG. 8A, when a sensing device operates in the first mode, five transmitting lines TXE (selected from second sensor electrodes 820) respectively connected to transmitters TX and three receiving lines RXE (selected from first sensor electrodes 810) respectively connected to receivers RX may perform a sensing operation based on a mutual-capacitance method, in the sensing area SA.

Referring to FIG. 8B, when the sensing device operates in the first mode, five receiving lines RXE respectively connected to receivers RX may perform a sensing operation based on a self-capacitance method, in the sensing area SA.

Referring to FIG. 8C, different from the aforementioned exemplary embodiments, when the sensing device operates in the second mode or the third mode, two transmitting lines TXE+ and TXE− respectively connected to transmitters TX+ and TX− and two receiving lines RXE+ and RXE− respectively connected to receivers RX+ and RX− may perform a sensing operation based on the mutual-capacitance method, in the sensing area SA.

As described above, the touch panel controller 200 in the present exemplary embodiment may sense the sensing area SA having the substantially the same size while using a reduced number of sensor lines, thus reducing power consumption.

In the description below, one or more modified exemplary embodiments of driving a touch panel with a touch panel controller will be described with reference to FIGS. 9 and 10.

Figure 9:
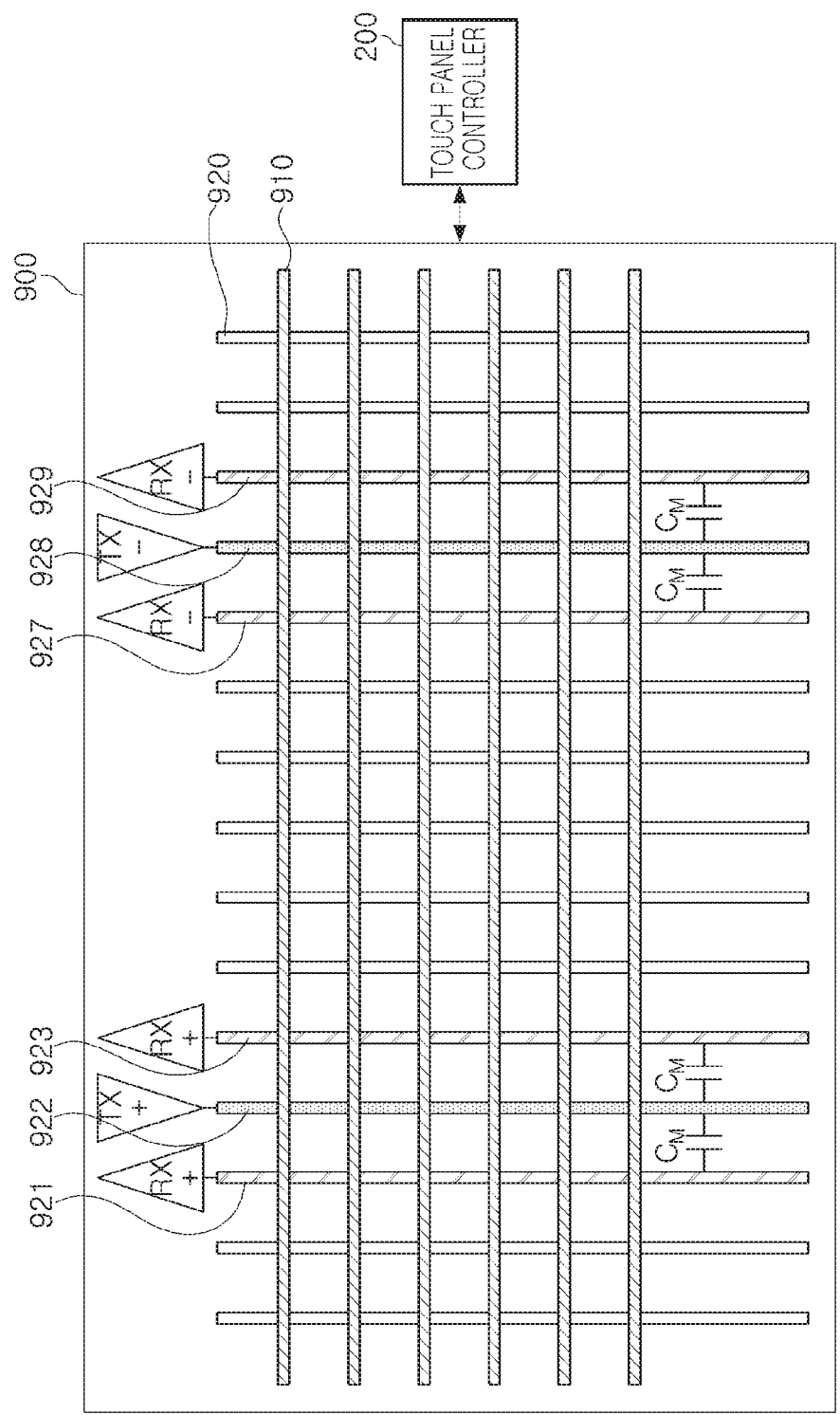
FIGS. 9 and 10 are diagrams illustrating a method of driving a touch panel with a touch panel controller according to exemplary embodiments of the present inventive concept.
Figure 10:
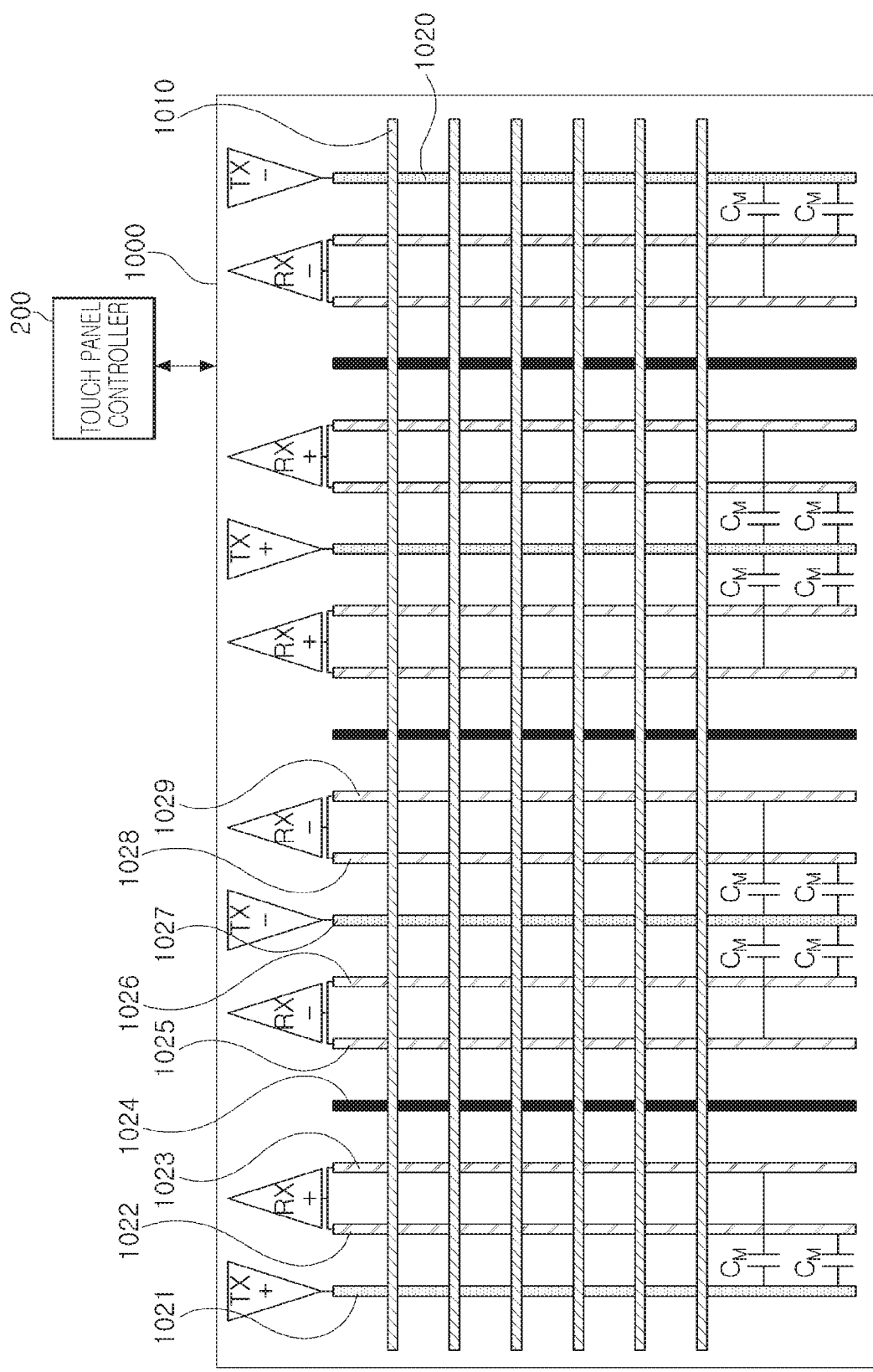

FIGS. 9 and 10 are diagrams illustrating a method of driving a touch panel with a touch panel controller according to exemplary embodiments of the present inventive concept.

Referring to FIG. 9, a sensing device may include the touch panel controller 200 and a touch panel 900 including first sensor electrodes 910 and second sensor electrodes 920. When the sensing device operates in the second mode or the third mode, the touch panel controller 200 may select a 2nd second sensor electrode 922 of the second sensor electrodes 920 of the touch panel 900 as a first transmitting electrode TXE+ connected to a first transmitter TX+, and may select an n−1st second sensor electrode 928 of the second sensor electrodes 920 as a second transmitting electrode TXE− connected to a second transmitter TX−.

The touch panel controller 200 may select 1st and 3rd second sensor electrodes 921 and 923 adjacent to the first transmitting electrode TXE+ (the 2nd second sensor electrode 922) as first receiving electrodes RXE+ respectively connected to first receivers RX+. Each of the first receiving electrodes RXE+ may form the mutual capacitance $C_M$ with the first transmitting electrode TXE+. Additionally, the touch panel controller 200 may select n−2nd and nth sensor electrodes 927 and 929 adjacent to the second transmitting electrode TXE− (the n−1st second sensor electrode 928) as second receiving electrodes RXE− respectively connected to second receivers RX−. Each of the second receiving electrodes RXE− may form the mutual capacitance CM with the second transmitting electrode TXE−.

When a gap between the first transmitting electrode TXE+ and the second transmitting electrode TXE− is relatively large as illustrated in FIG. 9, the touch panel controller 200 may not select a shielding electrode.

Thus, when only detecting whether a user input occurs, a minimum number of sensor electrodes may be driven using the driving method illustrated in FIG. 9. Accordingly, power consumption may be reduced, and a user input may be detected instantly.

Referring to FIG. 10, a sensing device may include the touch panel controller 200 and a touch panel 1000 including first sensor electrodes 1010 and second sensor electrodes 1020. When the sensing device operates in the second mode or the third mode, the touch panel controller 200 may select a 1st second sensor electrode 1021 of the second sensor electrodes 1020 of the touch panel 1000 as a first transmitting electrode TXE+ connected to a first transmitter TX+, and may select a 7th second sensor electrode 1027 of the second sensor electrodes 1020 as a second transmitting electrode TXE− connected to a second transmitter TX−. Accordingly, the 1st second sensor electrode 1021 and the 7th second sensor electrode 1027 may be configured as a pair of transmitting electrodes TXE+ and TXE−.

The touch panel controller 200 may select 2nd and 3rd second sensor electrodes 1022 and 1023 as first receiving electrodes RXE+ respectively connected to first receivers RX+, and forming the mutual capacitance $C_M$ with the first transmitting electrode TXE+ (the 1st second sensor electrode 1021). Additionally, the touch panel controller 200 may select 5th, 6th, 8th, and 9th second sensor electrodes 1025, 1026, 1028, and 1029 as second receiving electrodes RXE− respectively connected to second receivers RX−, and forming the mutual capacitance $C_M$ with the second transmitting electrode TXE− (the 7th second sensor electrode 1027).

Using the above-described method, the touch panel controller 200 may include the plurality of receiving electrodes RXE+ and RXE−, thus increasing a magnitude of a sensing signal. Thus, using the driving method illustrated in FIG. 10, a user input may be detected while significantly reducing an effect from noise and increasing sensing sensitivity.

Figure 11:
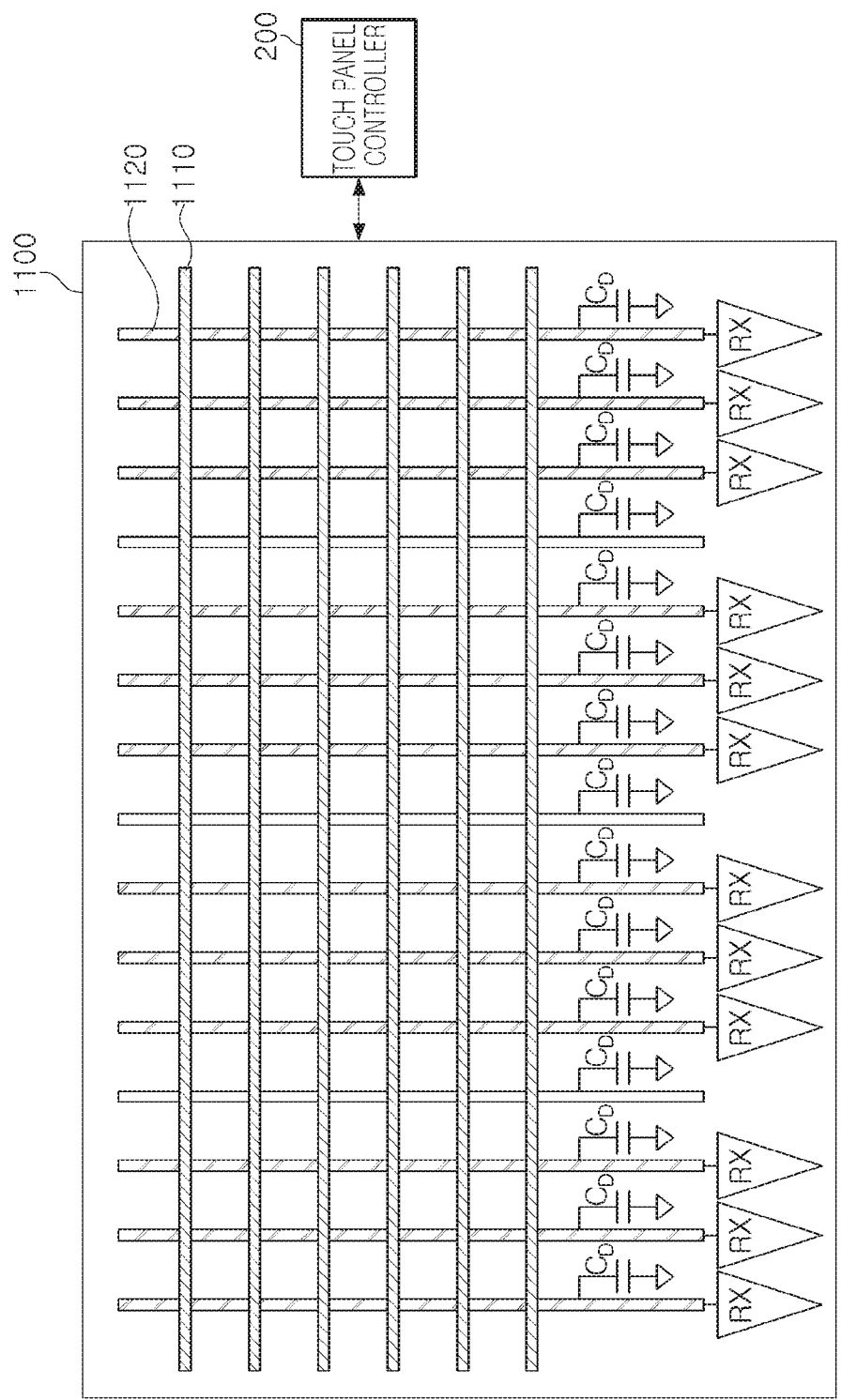
FIGS. 11 to 13 are diagrams illustrating a method of driving a touch panel with a touch panel controller according to exemplary embodiments of the present inventive concept.
Figure 12:
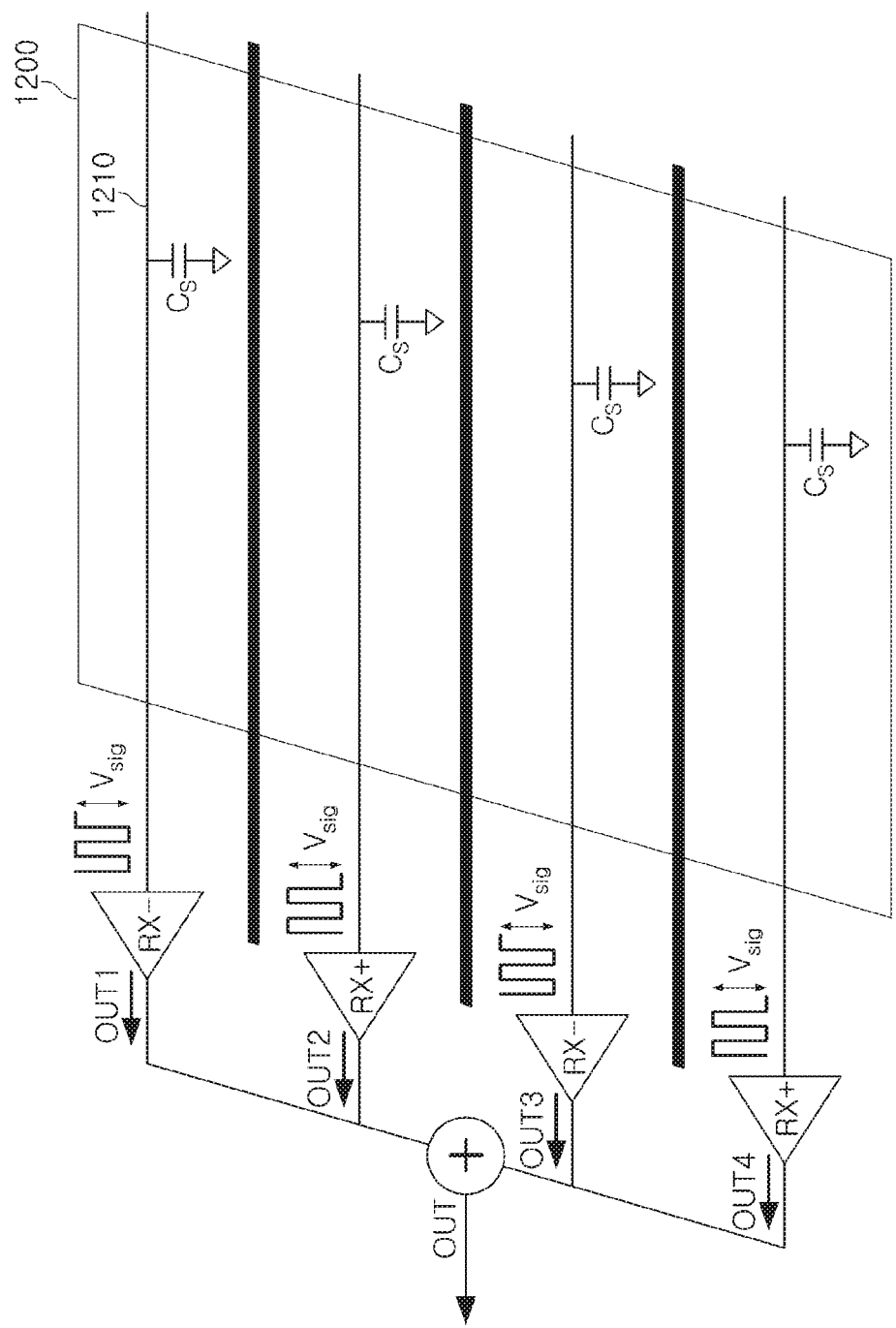
Figure 13:
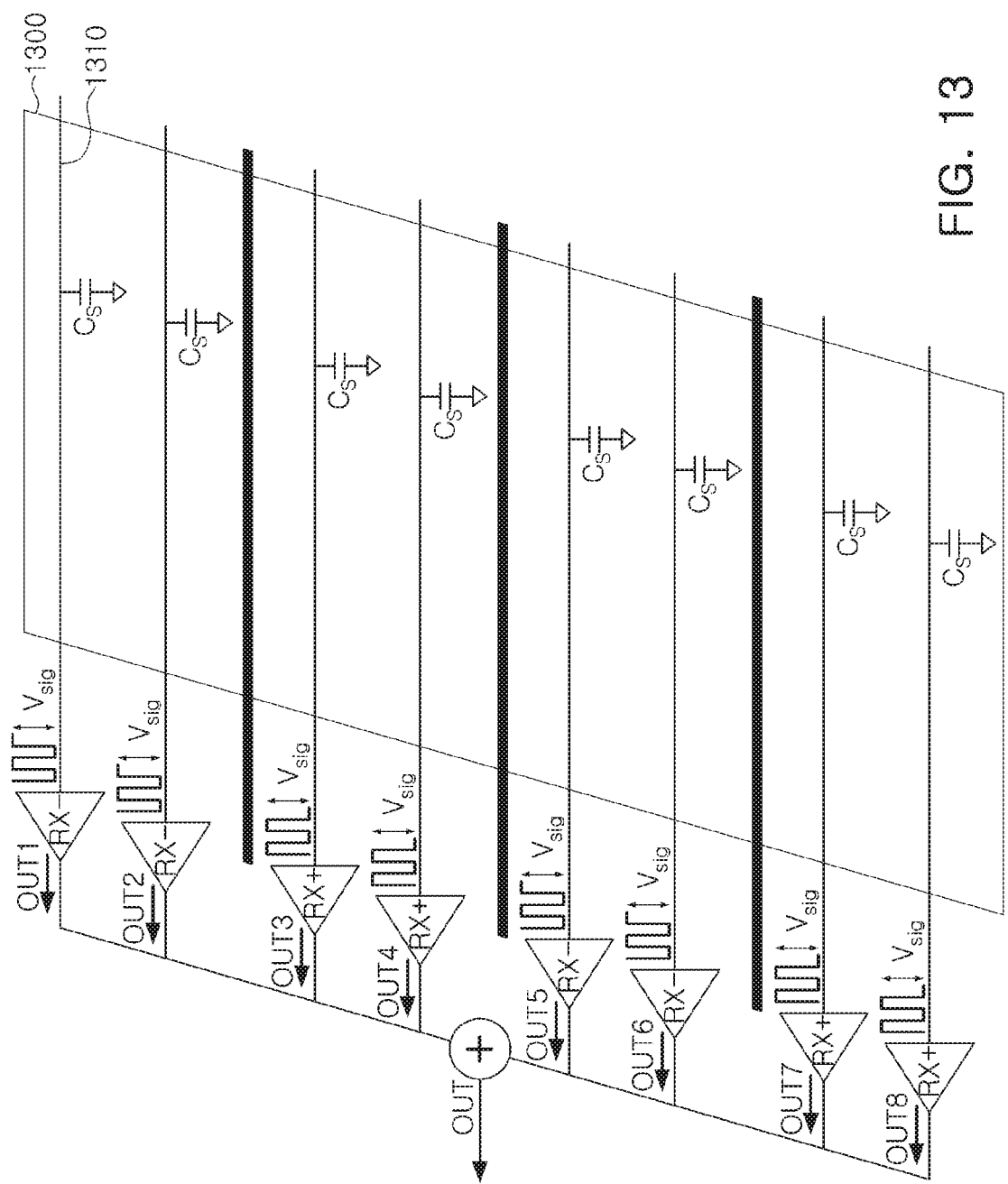

FIGS. 11 to 13 are diagrams illustrating a method of driving a touch panel with a touch panel controller according to exemplary embodiments of the present inventive concept.

FIG. 11 is a diagram illustrating a method of driving a touch panel 1100 when a sensing device operates in the first mode, and FIGS. 12 and 13 are diagrams illustrating a method of driving touch panels 1200 and 1300 when the sensing device operates in the second mode and the third mode. In the exemplary embodiment illustrated in FIGS. 11 to 13, the sensing device may perform a sensing operation based on a self-capacitance method.

Referring to FIG. 11, the touch panel 1100 may include first sensor electrodes 1110 and second sensor electrodes 1120. When the sensing device operates in the first mode, the touch panel controller 200 may select the second sensor electrodes 1120 as receiving electrodes RXE respectively connected to receivers RX.

The touch panel controller 200 may receive an electrical signal output from the receiving electrodes RXE and may detect whether a user input occurs and a position (a coordinate value) in which the user input occurs.

Referring to FIG. 12, when the sending device operates in the second mode or the third mode, the touch panel controller 200 may select at least a pair of receiving electrodes RXE+ and RXE− from among first sensor electrodes 1210 of the touch panel 1200. Each pair of the receiving electrodes RXE+ and RXE− may include a first receiving electrode RXE+ outputting first sensing signals OUT2 and OUT4 through a first receiver RX+ and a second receiving electrode RXE− outputting second sensing signals OUT1 and OUT3 through a second receiver RX−. The first sensing signals OUT2 and OUT4 may correspond to a change in a first self capacitance produced by the first receiving electrode RXE+. The second sensing signals OUT1 and OUT3 may correspond to a change in a second self capacitance produced by the second receiving electrode RXE−. The first sensing signals OUT2 and OUT4 and the second sensing signals OUT1 and OUT3 may have the same magnitude $V_{sig}$, and may have a phase difference of 180 degrees therebetween. The user input may be detected by using a summation signal of the first sensing signals OUT2 and OUT4 and the second sensing signals OUT1 and OUT3.

At least one sensor electrode may be disposed between the first receiving electrode RXE+ and the second receiving electrode RXE−. The touch panel controller 200 may select at least one of the at least one sensor electrode disposed between the first receiving electrode RXE+ and the second receiving electrode RXE− as a shielding electrode. In an exemplary embodiment of the present inventive concept, the touch panel controller 200 may connect one of the at least one sensor electrode disposed between the first receiving electrode RXE+ and the second receiving electrode RXE− adjacent to each other to a ground power, or may float it, to configure the shielding electrode.

Alternatively, the touch panel controller 200 may select second sensor electrodes orthogonal to the first sensor electrodes 1210 as the receiving electrodes RXE respectively connected to receivers RX.

Referring to FIG. 13, when the sensing device operates in the second mode or the third mode, the touch panel controller 200 may select at least a pair of the receiving electrodes RXE+ and RXE− from among first sensor electrodes 1310 of the touch panel 1300. Each pair of the receiving electrodes RXE+ and RXE− may include a plurality of first receiving electrodes RXE+ and a plurality of second receiving electrodes RXE−.

The first receiving electrodes RXE+ may output first sensing signals OUT3, OUT4, OUT7, and OUT8 through receivers RX+. The second receiving electrodes RXE− may output second sensing signals OUT1, OUT2, OUT5, and OUT6 through receivers RX−. The first sensing signals OUT3, OUT4, OUT7, and OUT8 and the second sensing signals OUT1, OUT2, OUT5, and OUT6 may have the same magnitude $V_{sig}$, and may have a phase difference of 180 degrees therebetween.

At least one sensor electrode may be disposed between the first receiving electrodes RXE+ and the second receiving electrodes RXE− in each pair of the receiving electrodes. The touch panel controller 200 may select at least one of the at least one sensor electrode as a shielding electrode. As the shielding electrode is connected to a ground power or floats, the shielding electrode may remove interference between the first receiving electrodes RXE+ and the second receiving electrodes RXE−.

Alternatively, the touch panel controller 200 may select second sensor electrodes orthogonal to the first sensor electrodes 1310 as the receiving electrodes RXE.

Figure 14:
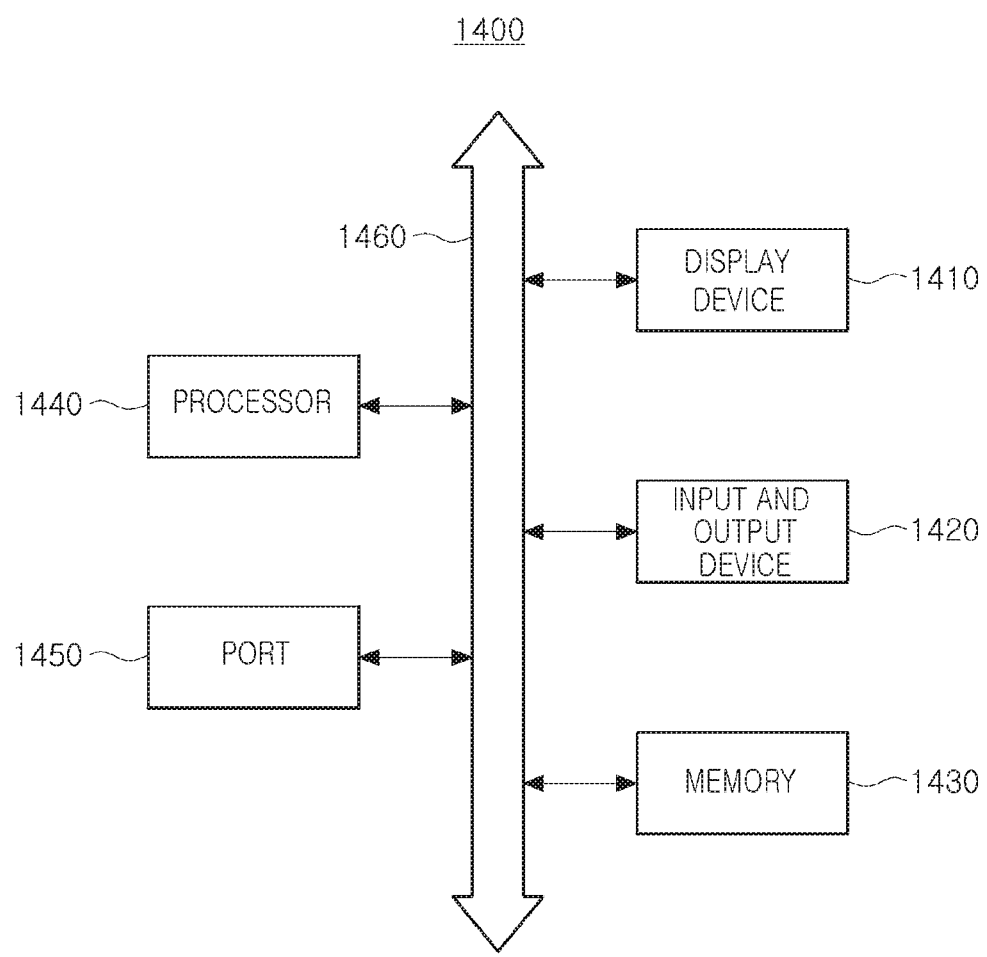
FIG. 14 is a block diagram illustrating an electronic device including a sensing device according to an exemplary embodiment of the present inventive concept.

FIG. 14 is a block diagram illustrating an electronic device including a sensing device according to an exemplary embodiment of the present inventive concept.

Referring to FIG. 14, an electronic device 1400 may include a display device 1410, an input and output device 1420, a memory 1430, a processor 1440, a port 1450, and the like. For example, the electronic device 1400 may further include a wired and wireless communication device, a power device, or the like. Among the elements illustrated in FIG. 14, the port 1450 may be implemented as a device provided for the electronic device 1400 to communicate with a video card, a sound card, a memory card, or the like. The electronic device 1400 may include a general desktop computer and a laptop computer, and may also include a smartphone, a tablet personal computer (PC), a smart wearable device, or the like.

The processor 1440 may perform a certain calculation and may process a command word, a task, or the like. The processor 1440 may be implemented as a central processing unit (CPU), a microcontroller unit (MCU), a system-on-chip (SoC), or the like, and may communicate with the display device 1410, the input and output device 1420, and the memory 1430, as well as other devices connected to the port 1450, through a bus 1460. The processor 1440 may be integrated with the processor 230 of the display device described with reference to FIGS. 1 to 13.

The memory 1430 may be implemented as a storage medium storing data required for operation of the electronic device 1400, multimedia data, or the like. The memory 1430 may include a volatile memory, or a non-volatile memory such as a flash memory or the like. The memory 1430 may also include at least one of a solid state drive (SSD), a hard disk drive (HDD), and an optical disk drive (ODD) as a storage device. The input and output device 1420 may include an input device such as a keyboard, a mouse, a touchscreen, or the like, provided to a user, and an output device such as a display, an audio output unit, or the like.

The display device 1410 may be connected to the processor 1440 by the bus 1460 or another communication means. The display device 1410 may be implemented in the electronic device 1400 according to the aforementioned exemplary embodiments described with reference to FIGS. 1 to 13.

According to the aforementioned exemplary embodiments of the present inventive concept, the touch panel controller of the sensing device may remove noise signals flowing into the touch panel from the display panel, thus improving sensing sensitivity.

The touch panel controller may improve sensing sensitivity in relation to an object having the same area. The touch panel controller may also remove noise signals flowing into the display panel from the touch panel, thus improving image quality of the display panel.

The sensing device may decrease the number of sensor electrodes for detecting a user input, thus significantly reducing power consumption. The sensing device may also drive a minimal number of sensor electrodes and may swiftly detect whether a user input occurs.

While the present inventive concept has been shown and described with reference to exemplary embodiments thereof, it will be apparent to those of ordinary skill in the art that modifications and variations in form and details could be made thereto without departing from the spirit and scope of the present inventive concept as set forth by the appended claims.

What is claimed is:

1. A sensing device, comprising:
a touch panel including a plurality of first sensor electrodes extending in a first direction and a plurality of second sensor electrodes extending in a second direction crossing the first direction; and
a touch panel controller configured to acquire a sensing signal from the touch panel and detect a user input based on the sensing signal,
wherein the touch panel controller acquires the sensing signal from at least one of the plurality of first sensor electrodes and the plurality of second sensor electrodes in a first mode operating at a first power, and
wherein, in a second mode and a third mode, the touch panel controller selects a first transmitting electrode, a second transmitting electrode, and a plurality of receiving electrodes, inputs a first driving signal to the first transmitting electrode, and inputs a second driving signal to the second transmitting electrode,
wherein the touch panel controller selects each of the first transmitting electrode, the second transmitting electrode, and the plurality of receiving electrodes from one of the plurality of first sensor electrodes and the plurality of second sensor electrodes,
wherein the sensing device operates at a second power lower than the first power in the second mode,
wherein the sensing device performs a proximity sensing operation in the third mode, and
wherein the second driving signal has a phase difference of 180 degrees with respect to the first driving signal.

2. The sensing device of claim 1, wherein the touch panel controller selects the plurality of receiving electrodes from among a plurality of sensor electrodes disposed between the first transmitting electrode and the second transmitting electrode.

3. The sensing device of claim 1, wherein each of the plurality of receiving electrodes forms mutual capacitance with one of the first transmitting electrode and the second transmitting electrode.

4. The sensing device of claim 3, wherein the number of receiving electrodes forming mutual capacitance with the first transmitting electrode is the same as the number of receiving electrodes forming mutual capacitance with the second transmitting electrode.

5. The sensing device of claim 3, wherein the touch panel controller acquires a first sensing signal from a receiving electrode forming mutual capacitance with the first transmitting electrode, acquires a second sensing signal from a receiving electrode forming mutual capacitance with the second transmitting electrode, and acquires the sensing signal by differentiating the first sensing signal and the second sensing signal.

6. The sensing device of claim 1, wherein the touch panel controller selects at least one of a plurality of sensor electrodes disposed between the first transmitting electrode and the second transmitting electrode as a shielding electrode.

7. The sensing device of claim 6, wherein the shielding electrode receives a ground voltage.

8. The sensing device of claim 1, wherein the touch panel controller comprises:
a driver configured to select the first transmitting electrode, the second transmitting electrode, and the plurality of receiving electrodes;
an electric charge amplifier configured to convert first sensing signals received from the plurality of receiving electrodes to voltage signals; and
an analog-digital converter configured to convert the voltage signals to digital signals.

9. The sensing device of claim 8, wherein the touch panel controller further comprises a gain amplifier connected to an output terminal of the electric charge amplifier, and configured to amplify the voltage signals, and output the amplified voltage signals to the analog-digital converter.

\* \* \* \* \*